United States Patent [19]

Molina et al.

[11] Patent Number: 4,944,262

[45] Date of Patent: Jul. 31, 1990

[54] ROTATIVE COMBUSTION CHAMBER ENGINE

[75] Inventors: Richard W. Molina, Dallas, Tex.; Manuel Cortina, Mexico City, Mexico; Roberto Bertolina, Naucalpan, Mexico; Luis H. Balsa, Cuautitlan, Mexico

[73] Assignee: INASA Automotive, Inc., Dallas, Tex.

[21] Appl. No.: 333,316

[22] Filed: Apr. 5, 1989

[51] Int. Cl.$^5$ .................................. F01L 7/00
[52] U.S. Cl. ........................... 123/190 BD; 123/41.40; 123/151; 123/634; 123/470; 123/80 R
[58] Field of Search ......... 123/190 BD, 190 E, 41.40, 123/151, 634, 636, 470, 471, 80 R

[56] References Cited

U.S. PATENT DOCUMENTS

| | | | |
|---|---|---|---|
| 973,800 | 10/1910 | McKinnon | 123/190 A |
| 994,541 | 6/1911 | Shakley | 123/190 A |
| 1,245,257 | 11/1917 | Miller | 123/190 A |
| 1,273,433 | 7/1918 | Wehr | 123/190 BB |
| 1,620,832 | 3/1927 | Porter | 123/190 E |
| 1,649,235 | 11/1927 | Jones | 123/190 BD |
| 1,868,301 | 7/1932 | Zeeman | 123/190 BD |
| 2,745,395 | 5/1956 | Genet | 123/190 E |
| 3,822,682 | 7/1974 | Sherwood | 123/190 E |
| 3,945,364 | 3/1976 | Cook | 123/190 BD |
| 3,948,227 | 4/1976 | Guenther | 123/190 BD |
| 4,022,178 | 5/1978 | Cross | 123/190 E |
| 4,098,238 | 7/1978 | Vallejos | 123/190 |
| 4,098,514 | 7/1978 | Guenther | 123/190 E |
| 4,114,639 | 9/1978 | Cross | 123/190 E |
| 4,506,636 | 3/1985 | Negre | 123/190 E |
| 4,562,796 | 1/1986 | Eickmann | 123/65 BA |
| 4,601,475 | 7/1986 | Nicholson | 277/205 |

Primary Examiner—E. Rollins Cross
Attorney, Agent, or Firm—Richards, Medlock & Andrews

[57] ABSTRACT

In accordance with one aspect of the present invention, an improvement in the combustion chamber of an internal combustion engine (10) is provided. A spherically shaped rotating element (22) is mounted in the engine head (20) for rotation about a first axis (24). The rotating element has a notch which aligns between the combustion chamber and inlet and exhaust passages as the rotating element rotates. A seal assembly (42) seals against the spherical rotating element. The annular seal (54) in contact with the rotating element rotates about an axis and is self-centering in its sealing action to reduce wear and increase sealing effectiveness. The annular seal is mounted and urged into sealing engagement with the rotating element with nested annular seal retainers (56) which also rotate. Various ignition sources can be used, including a spark plug (48) mounted in the rotating element, a laser ignition, multiple spark plugs and plugs having multiple ignition sparks as they pass in an arc across the combustion chamber. The advantages of the invention can be applied to two and four cycle engines and engines combusting gasoline, diesel or other fuels.

16 Claims, 8 Drawing Sheets

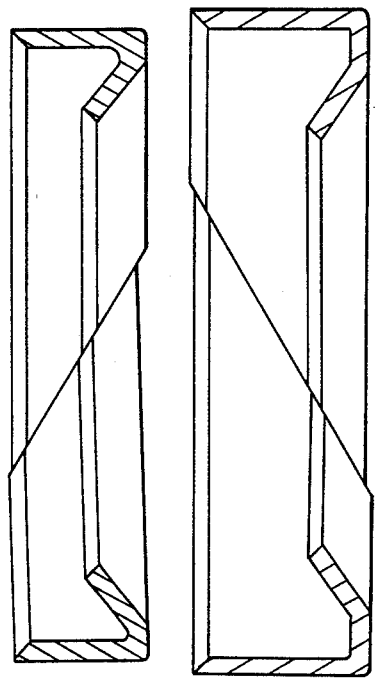
FIG. 4
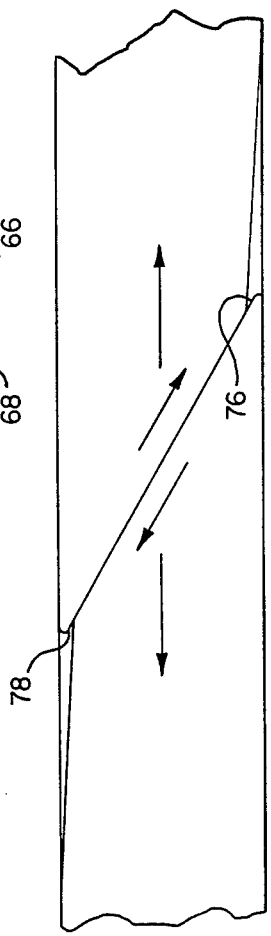
FIG. 5
FIG. 6

ROTATIVE COMBUSTION CHAMBER ENGINE

TECHNICAL FIELD

This invention relates to a rotative combustion chamber and its seal for an internal combustion engine.

BACKGROUND OF THE INVENTION

The internal combustion engine has countless applications in industrialized societies around the world. In virtually all such engines, a fuel is mixed with air and drawn into a combustion chamber. The combustion chamber is sealed, permitting a piston to decrease the volume of the combustion chamber and compress the fuel air mixture. The ignition source, such as a spark plug or adiabatic heating of the air fuel mixture, ignites the fuel, resulting in a sudden increase in pressure, driving the piston in the opposite direction to increase the volume of the combustion chamber and provide a power output to drive an automobile or the like. The combusted gases must be driven from the combustion chamber to permit a fresh fuel air mixture to be drawn into the combustion chamber to continue the cycle.

Traditionally, the movement of the air fuel mixture into the combustion chamber, and the exhaust of the combusted gases, is achieved by carefully timed opening of an intake valve allowing flow of the air fuel mixture into the combustion chamber and an exhaust valve to permit the combusted gases to be exhausted from the combustion chamber. The valves are normally operated by rotating cam shafts having eccentric cam lobes to provide the proper valve opening and closing sequence. While the valve operating train contains a multitude of parts, and hampers the performance of the engine, it has found wide acceptance.

However, because of the ever growing concern for controlling the emission of harmful combustion products and the realization of the limits to the fossil fuels typically used in the internal combustion engine, there has arisen a need to provide for more efficient operation of the internal combustion engine to overcome the inherent disadvantages of the traditional cam shaft operated valve train. Efforts in this area have been made for many years, and include such examples as Porter U.S. Pat. No. 1,620,832, issued Mar. 15, 1927; Genet U.S. Pat. No. 2,745,395, issued May 15, 1956 and Cross U.S. Pat. No. 4,114,639, issued Sept. 19, 1978. However, no design alternative to the conventional cam shaft operated valves has achieved significant commercial viability. A need therefore exists for an improved valving system which increases the efficiency of the internal combustion engine and overcomes the disadvantages inherent in the conventional valving system.

SUMMARY OF THE INVENTION

In accordance with one aspect of the present invention, an improved combustion chamber assembly is provided for an internal combustion engine having a block, the block defining a cylinder open at a first end and a piston movable within the cylinder. The assembly includes a head for mounting on the block which defines an inlet passage and an exhaust passage. A rotating element, having a generally spherical outer surface, is mounted in the head for rotation about a first axis. A depression is formed into the outer surface of the rotating element to define a notch. An annular seal assembly is provided which includes a seal ring forming a circular seal with the outer surface of the rotating element. The circular seal lies in a plane generally parallel the first axis with the block, seal assembly, piston and rotating element defining a combustion chamber.

Rotation of the rotating element about the first axis in a first rotational direction sequentially connects the inlet passage and combustion chamber through the notch to enter a charge into the combustion chamber, seals the combustion chamber for compression and combustion and connects the exhaust passage to the combustion chamber through the notch to exhaust the combusted gases. The annular seal ring rotates about a second axis perpendicular the sealing plane as the valve element rotates to equalize wear between the seal ring and the rotating element.

In accordance with another aspect of the present invention, the seal plane and first axis are set at a slight angle to each other to induce rotation of the seal ring. The seal assembly further includes a first non-continuous annular seal retainer having first and second abutting ends. The first annular seal retainer has an annular notch for receiving a portion of the seal ring, with the annular seal retainer configured to urge the seal ring into sealing engagement with the rotating element during the combustion cycle. The first and second abutting ends lie in parallel planes which extend obliquely to the sealing plane and are in sliding engagement to each other so that the first and second ends slip relative to each other as the annular seal retainer expands and contracts with temperature variation. In accordance with another aspect of the present invention, a second non-continuous annular seal retainer is provided which defines an annular notch for receiving a portion of the first non-continuous annular seal retainer. The second non-continuous annular seal retainer also urges the seal ring into sealing engagement with the rotating element during the combustion cycle.

In accordance with other advantages of the present invention, a coolant passage can be formed through the interior of the rotating element. In accordance with another aspect, structure can be provided for mounting a spark plug in the rotating element, with the spark end exposed to the combustion chamber at the point of combustion while the electrode end is never exposed to the combustion chamber.

BRIEF DESCRIPTION OF THE DRAWINGS

Further objections and advantages of the invention will become more apparent from the following description and claims, and from the accompanying drawings, wherein:

FIG. 4 is a cross sectional view of annular seal retainers used in the seal assembly;

FIG. 5 is a detailed view of the sliding joint between the ends of the first seal retainer;

FIG. 6 is a detailed view of the sliding ends of the second seal retainer;

DETAILED DESCRIPTION

Figure 1:
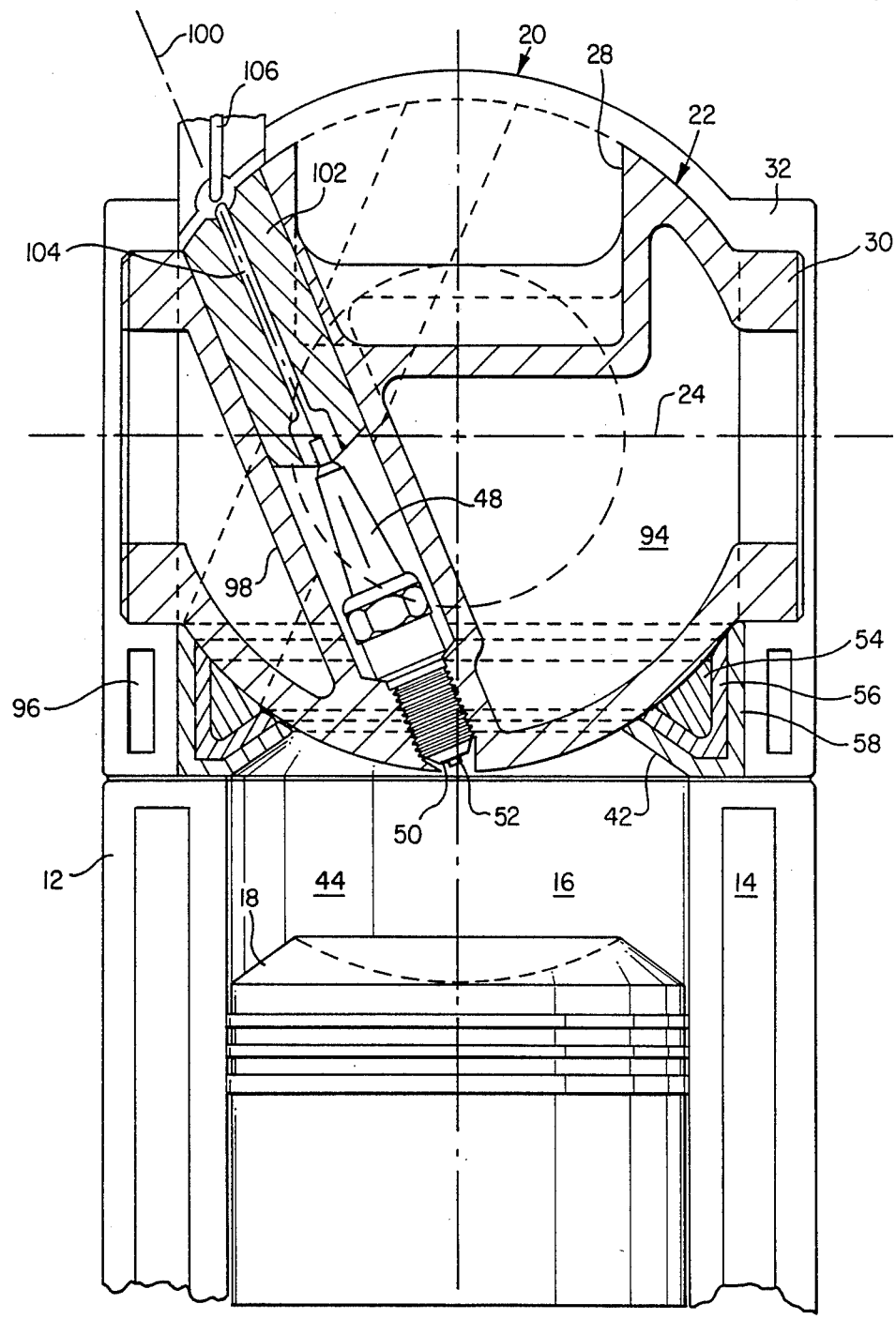
FIG. 1 is a vertical cross sectional view of an internal combustion engine designed in accordance with the teachings of the present invention taken along the length of the engine.
Figure 2:
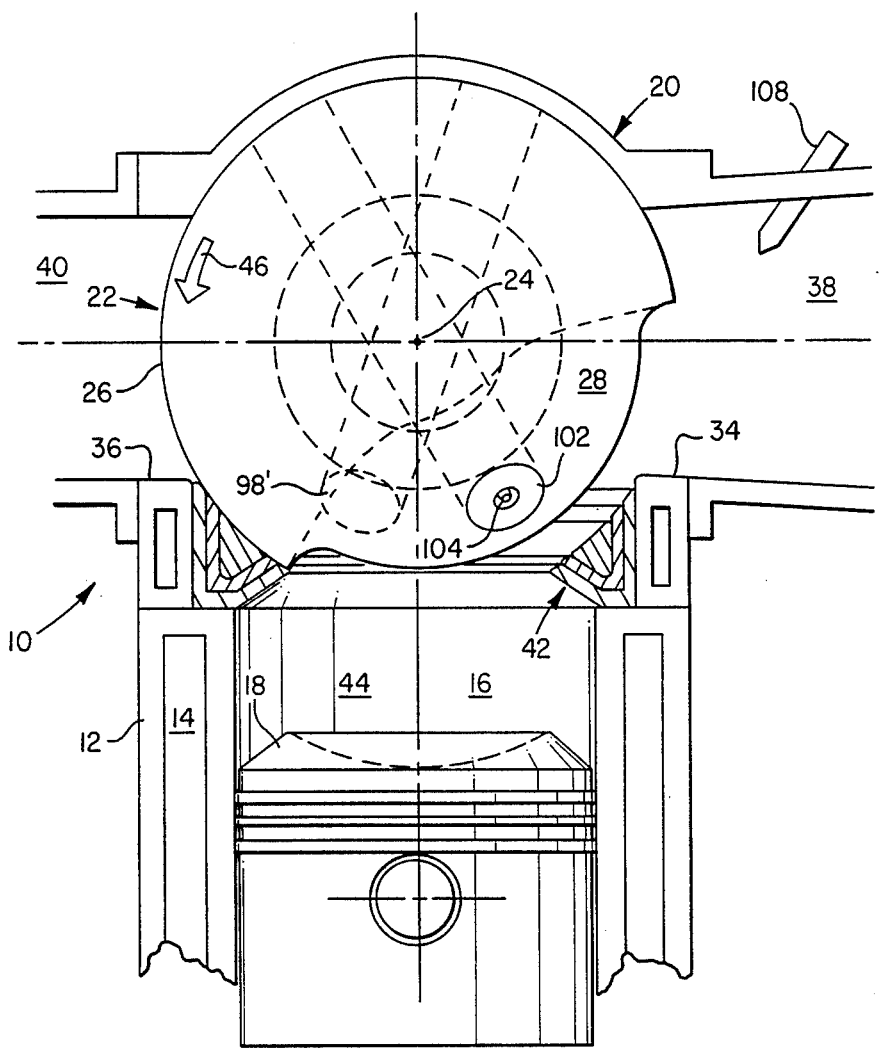
FIG. 2 is a vertical cross sectional view of the engine taken across the width of the engine.
Figure 3:
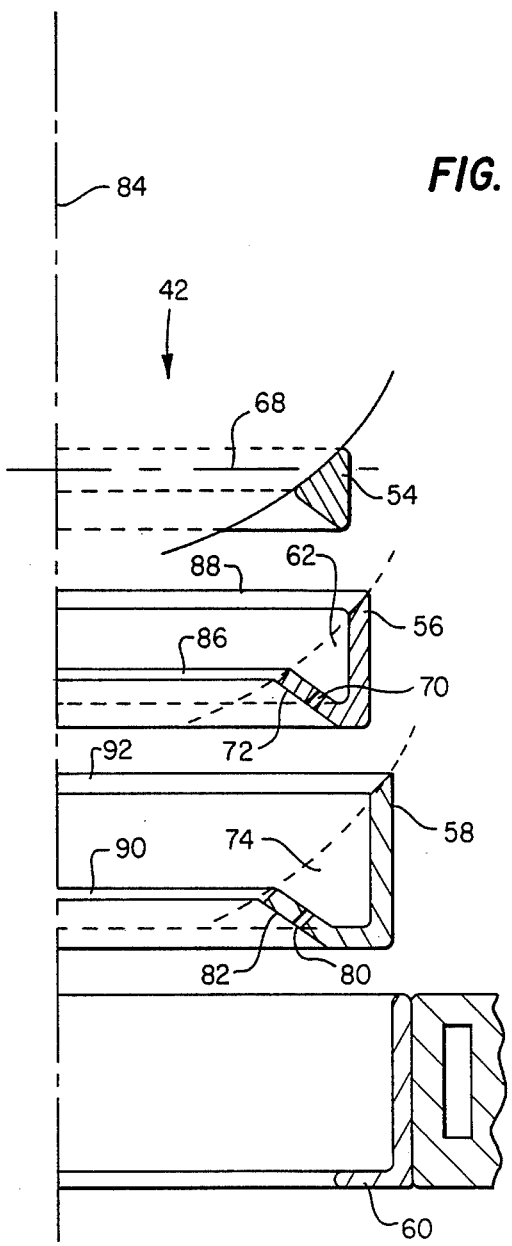
FIG. 3 is an exploded view illustrating the seal assembly employed in the engine.

With reference now to FIGS. 1 and 2, an internal combustion engine 10 incorporating a first embodiment of the present invention is illustrated.

The engine 10 includes a relatively conventional block 12 which has coolant passages 14 and defines at least one cylinder 16. As will be apparent from the following description, the advantages of the present invention can be incorporated in any internal combustion engine, regardless of the number of cylinders or their configuration.

Piston 18 moves along the cylinder 16, and is connected to a connecting rod, crankshaft and the like in a manner well understood.

The head 20 is mounted on block 12 as illustrated. The head includes and supports a rotating element 22 for rotation about a first axis 24, as best seen in FIG. 2. As can be seen, the outer surface 26 of rotating element 22 has a generally spherical configuration, interrupted by a notch 28 formed into the element and opposed cylindrical portions 30 which cooperate with bearings 32 in the head to facilitate rotation about the first axis 24. On one side of the head 20 is formed an inlet passage 34, while on the opposite side of the head is formed an exhaust passage 36. A conventional inlet manifold 38 is secured to the head for supplying air or an air fuel mixture for combustion to the inlet passage 34. An exhaust manifold 40 is mounted to the head for exhausting combusted gases from the exhaust passage 36.

An annular seal assembly 42 is mounted in the head 20 and acts to form a seal between the block, head and the rotating element to define a combustion chamber 44. In operation, if the engine 10 is a four cycle auto or diesel cycle engine, the rotating element 22 is rotated in a first direction about the first axis, as indicated by arrow 46, with an angular velocity one-half of that of the crank shaft in the engine The rotation can be affected by any suitable mechanism, including a drive chain, drive belt, or gear arrangement. The motion of the rotating element 22 is timed so that as the piston 18 is moving downward in the combustion chamber to create a relative vacuum therein, the rotating element 22 is moving through the position illustrated in FIG. 2, where the notch 28 connects the inlet passage with the combustion chamber, to permit a combustion air or air fuel mixture to flow from the inlet manifold into the combustion chamber. When the piston begins upward movement in the cylinder on the compression stroke, the rotating element 22 has preferably rotated so that notch 28 is outside the circle of seal assembly 42 to present an uninterrupted concave portion of the outer surface 26 to the combustion chamber to allow pressurization of the air fuel mixture. As the piston completes its compression stroke, a spark plug 48, mounted in the valve element with the ignition tip end opening through a port 50 in the valve element, begins an arcuate passage across the combustion chamber. One or more sparks can be generated at the tip 52 of the plug to ignite the air and fuel mixture in the combustion chamber. During the power stroke of the engine, as the piston is driven downward in the cylinder by the pressure of the combusting gases, the rotating element continues to present an uninterrupted concave portion of the outer surface to the combustion chamber. As the piston begins its upward movement in the exhaust stroke, the notch has moved into a configuration to connect the combustion chamber with the exhaust passage 36 which permits the combusted air fuel mixture to be exhausted through the exhaust manifold 40.

With reference now to FIGS. 3-6, the details of the seal assembly 42 will be described in greater detail. Seal assembly 42 includes an annular seal ring 54, a first annular seal retainer 56, a second annular seal retainer 58 and a base 60. The annular seal ring 58 is urged into sealing contact with the outer surface of the valve element by the other elements of the seal assembly, assisted by the pressurization of the combustion chamber during compression and power strokes.

The first annular seal retainer 56 can be seen to have a generally V-shaped cross section which defines a notch 62 to receive a portion of the annular seal ring 54. The first annular seal retainer 56 forms a non-continuous ring, with ends 64 and 66 abutting one another as illustrated in FIGS. 4 and 5. While the seal between seal ring 54 and the rotating element 22 can be seen to lie in a seal plane 68, the ends 64 and 66 extend in planes oblique to the seal plane 68. A series of ports 70 are formed through wall 72 of seal retainer 56 exposed to the combustion chamber. The configuration of the second annular seal retainer 58 is similar to seal retainer 56, having a generally V-shaped cross section with a notch 74 to receive a portion of seal retainer 56. The seal retainer 58 is also a non-continuous ring having abutting ends 76 and 78 also lying in planes oblique to the seal plane 68. The second annular seal retainer 58 has a series of ports 80 formed through the wall 82 facing the combustion chamber as well. Second annular seal retainer 58 rests in base 60, as seen in FIG. 2.

A significant advantage of the seal assembly 42 is that the seal ring 54, and seal retainers 56 and 58, each rotate in the seal plane as the rotating element rotates about the first axis. This rotation provides for uniform wear between the seal ring and the rotating element to ensure a long term, effective seal not subject to notching or blow by as may occur if the seal was maintained fixed. The rotation is preferably achieved by providing a slight angle between the first axis 24 and the seal plane 68, for example, one quarter degree (15 minutes) of arc. That slight angle causes the surface velocity of the rotating element on the left side of FIG. 1 where it engages the annular seal to be somewhat different than the surface velocity of the rotating element on the right side of FIG. 1 where it is contacted by the annular seal. This difference in velocity induces a rotation or progression of the seal 54, and therefore the seal retainers 56 and 58, about a rotational axis 84 extending perpendicular to the seal plane 68. As one example, for an engine crankshaft rotational velocity of 5,000 rpm, the portion of the annular seal in contact with the rotating element 22 might rotate at about 8 rpm.

When the engine is assembled, as shown in FIG. 1, the seal retainers 56 and 58, formed of somewhat resilient material, preferably urge the annular seal ring 54 into engagement with the valve element. Because of the orientation of walls 72 and 82 of the seal retainers, pressurization of the combustion chamber acts on those walls to force the annular seal ring into an enhanced sealing engagement with the valve element. Ports 70 and 80 permit combustion gases to enter the spaces between the retainers and seal ring to provide a gas cushion to enhance the seal as well.

The materials of seal retainers 56 and 58, as most materials, will expand or contract with temperature change. This phenomena is compensated for in the present invention by permitting the ends 64 and 66 of retainer 56 and ends 76 and 78 of retainer 58 to slide relative to each other, as best seen in FIGS. 5 and 6, as the engine warms up or cools down.

As can be seen from FIGS. 1 and 2, the edges 86 and 88 of seal retainer 56, and edges 90 and 92 of seal retainer 58 preferably do not come into contact with the rotating element, but define a slight gap therebetween at normal operating engine temperature. The gap between the edges 86 and 90 and the rotating element, exposed to the flame front in the combustion chamber, weakens the flame front actually reaching the interface between the annular seal ring 54 and the rotating element. A gap of a length of ¼ inch and a thickness of 0.020 inches would be suitable for this purpose.

With reference to FIG. 1, the rotating element can be seen to have a hollow interior 94 which forms a passage for flow of a liquid coolant. A coolant passage 96 can also be formed in the head immediately adjacent the seal assembly. Such a configuration provides for very effective cooling relative to conventional cam shaft operated valve arrangements, which, among other things, reduces the problem of pre-ignition or knocking, permitting the engine 10 to utilize a lower octane fuel or an increased compression ratio as desired.

As seen in FIGS. 1 and 2, the spark plug 48 is mounted within the rotating element in a cylindrical chamber 98. The center line 100 of the chamber 98 is tilted relative to the first axis 24 to ensure that the tip 52 of the spark plug passes in an arcuate path bisecting the combustion chamber while the end of the chamber 98 opposite port 50 is never exposed to the combustion chamber and its hostile combustion byproducts. An insulated plug 102 is inserted into cylindrical chamber 98 and has a conductor 104 extending from the end of the spark plug and to the exterior of the rotating element. A similar conductor 106 is mounted in the head and connected to a distributor and coil for providing the ignition spark to the spark plug. The conductor 106 is mounted in the head so that the conductors 104 and 106 move into electrical contact at precisely the rotational position of the rotating element 22 where the spark is to be generated at the tip 52 of the spark plug to ignite the air flow mixture.

The present invention provides great flexibility in the design of the ignition source, such as spark plug 48. For example, a second spark plug can be mounted in the rotating element in a cylindrical chamber 98' (as illustrated in dotted line in FIG. 2) so oriented that twin sparks can be delivered simultaneously at slightly different positions in the combustion chamber for a more uniform combustion. Whether using a single spark plug or multiple spark plugs, the tip of each plug will move across the combustion chamber in a arcuate path. This provides the possibility of extending the conductor 106 to form an arc of similar length to provide multiple ignition sparks at the tip of each spark plug as it moves across the combustion chamber, again enhancing the combustion process.

The design of the present invention provides significant advantages over conventional cam shaft operated valve engines. Modern cam shaft operated valve engines almost always require some overlap between the opening and closing of the intake and outlet valves, which creates significant emission control problems. In the present invention, there is never an overlap between inlet and exhaust flows. Though, the present invention allows overlap if desired. Another advantage is the significant reduction in parts required as compared to conventional valve engines. For example, a conventional engine having a two valve combustion chamber will have one cam shaft, two valve seats, two valves, four spring retainer keys, four spring bases, two lash cups or rocker arms, two valve guides, two valve seals, the head, and a valve cover totalling 23 separate pieces. If four valves are used for each combustion chamber, the number of pieces are almost doubled to 44. In contrast, for each cylinder in an engine incorporating the present invention, only seven pieces are required, including the four pieces of the seal assembly, the head, rotating element, and a valve cover.

With only the rotation of the rotating element 22 about first axis 24, and the slow progression of seal 54 and seal retainers 56 and 58, induced vibration is much less than in conventional valve designs, which provides for more quiet operation. The direct cooling of the rotating element and seal assembly provides for a greater control of engine temperature and an elimination of hot spots which create pre-ignition problems.

The volumetric efficiency of an engine incorporating the present invention is greatly enhanced over conventional engines because the alignment of notch 28 with the combustion chamber and either the inlet or outlet passages provide for significant gas flows with little resistance. An increase in volumetric efficiency can be directly translated into increased horsepower output from the engine.

The valve overlap is designed into conventional valve engines as a requirement to increase the main flow capacity to keep the combustion chamber clean at the beginning of the intake cycle. No conventional valve engine can fullfil the theoretically ideal separation of inlet and outlet valving function of 180° of cam shaft rotation. Presently, almost all cam shafts are set at 240°–260°, or between 60°–80° beyond the ideal opening point in the cycle. Thus, while chamber scavenging is improved, this overlap causes part of the emission air fuel mixture to be released unburned through the exhaust valve to produce high emission levels. While fuel injection has helped because the scavenging is carried out mostly with air if the injection is perfectly synchronized, it appears impossible to eliminate totally such overlap despite the enormous development in electronic engine controls.

The present invention is thus capable of having high values of main flow capacity without any overlap in the inlet and outlet cycle. Thus, the present invention can reach increases of more than 40% over even the best highest specific output multi-valve engines. Further, less power is consumed in an engine incorporating the present invention over conventional valving operation which has a multitude of valve motions. These factors all result in an increase in the fuel efficiency of the engine.

The design of the present invention also provides for a decrease in the level of contaminants by increasing the amount of air in the exhaust port. The reduction is achieved by mixing of the air in the notch carried between the inlet passage and the exhaust passage, and specifically reduces the emission of carbon monoxide, hydro-carbons and nitrogen monoxide.

The design of the present invention is well adapted for the use of fuel injection. For example, an injector 108, illustrated in FIG. 2, can be positioned in the inlet manifold 38 to correct a stream of fuel into the center of the piston, improving the mixing of fuel particles and refrigerating the surface of the piston at the same time. Further, injection in a conventional valve is interfered with by the opening and closing movement of the valve, while, in the design of the present invention, no such restriction is present.

Figure 8:
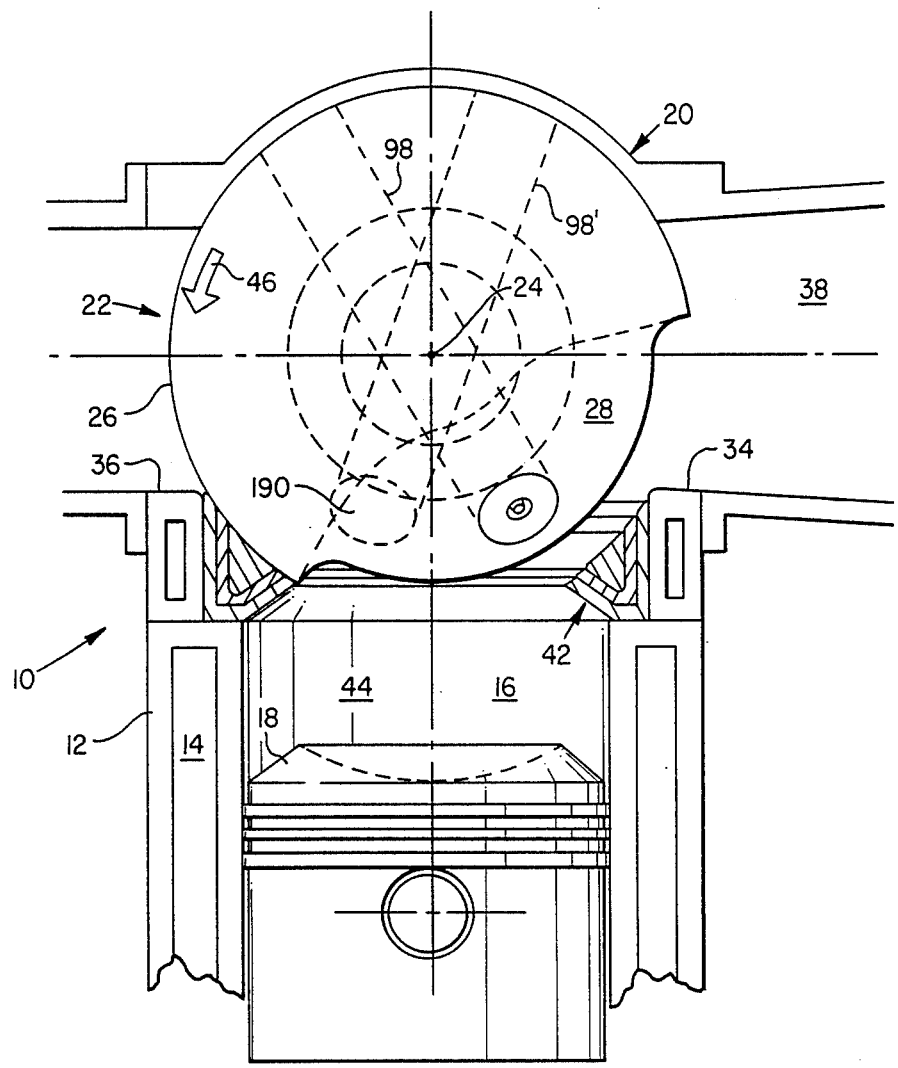
FIG. 8 is a vertical cross sectional view of a second modification of the engine illustrating a fuel injector in the rotative element.

Alternatively, as illustrated in FIG. 8, the fuel injector 190 can be mounted in element 22 in chamber 98' to inject the combustion fluid at the appropriate point in the combustion cycle.

Figure 10:
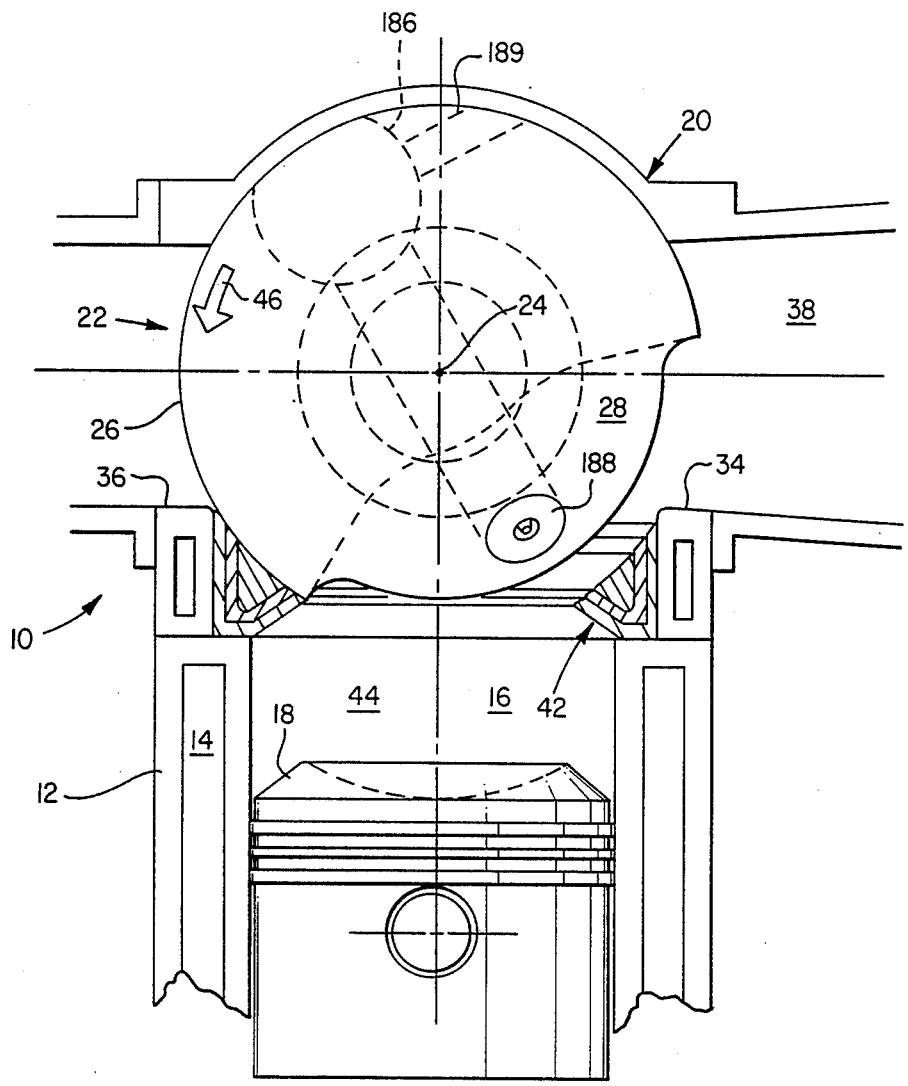
FIG. 10 is a vertical cross sectional view of a third modification of the engine illustrating use of a pre-combustion chamber.

Clearly, the advantages of the present invention can be realized if engine 10 is a gasoline engine, diesel engine or any other fueled engine. In a diesel application, chamber 98 can be occupied by a glow plug, while chamber 98' is occupied by a diesel fuel injector. Alternatively, as illustrated in FIG. 10, the element 22 can form a pre-combustion chamber 186 which opens into the combustion chamber, with a diesel fuel injector 188 to inject diesel fuel into chamber 186, and an ignition source or heater 189 to heat the pre-combustion mixture.

Among other advantages of the design of the present invention, the components of the annular seal assembly are self-centering on the rotating element at moments of greatest combustion chamber pressure. Further, none of the elements of the seal assembly must be lubricated, which reduces the presence of lubricating materials within the combustion chamber to produce carbon deposits or increase harmful emissions. The linear speed of the rotating element against the seal 54 are within acceptable parameters for effective sliding seals. The extreme simplicity of the seal assembly 42 and its operating principles provide low difficulty for manufacture and an absence of a need for sophisticated technology, reducing manufacturing costs. As a further advantage, should the seal assembly wear and need replacement, the replacement is quite easy and requires little skill.

Figure 7:
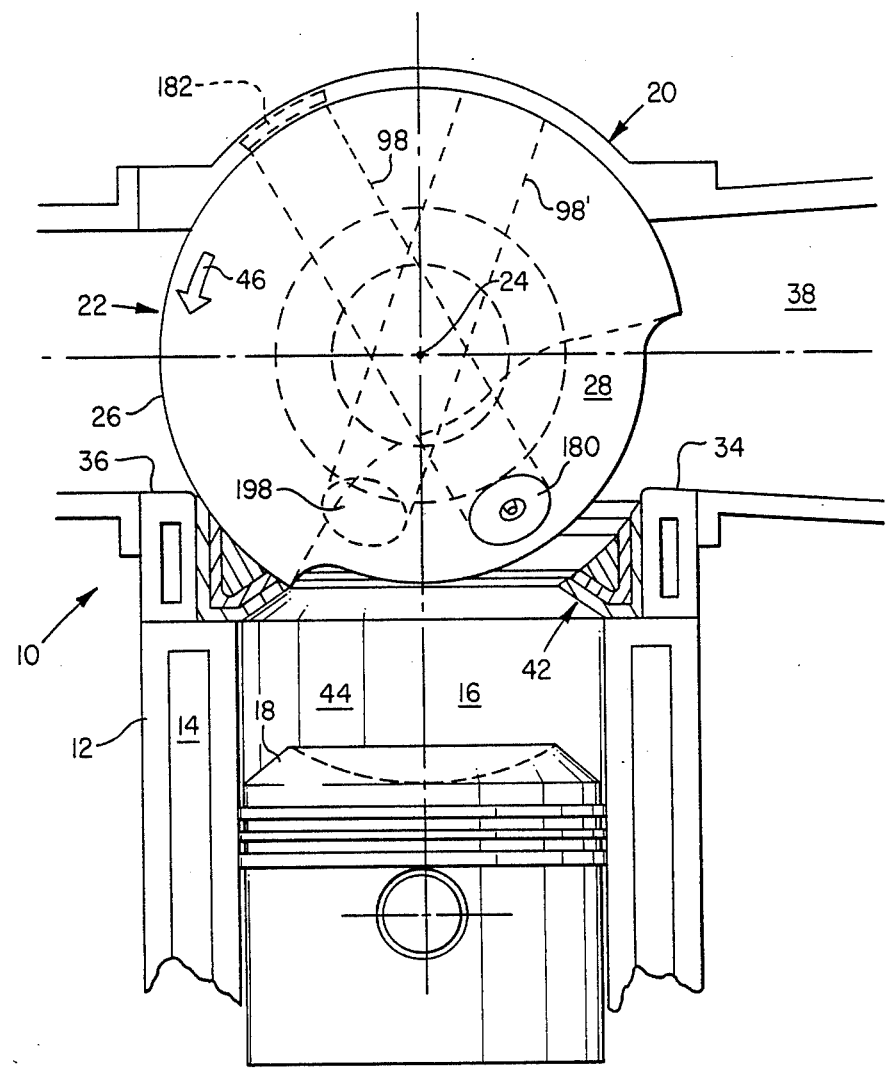
FIG. 7 is a vertical cross sectional view of a first modification of the engine illustrating an ignition coil in the rotative element.

The efficiency of spark plug operation should permit compression ratios of about eleven to one with conventionally available fuels without fear of pre-ignition or detonation. Further, as illustrated in FIG. 7, the high voltage spark generating coil 180 itself can be placed in the cylindrical chamber 98 if desired to generate a spark at the appropriate moment in the combustion cycle as it passes a stationary low voltage coil 182 without need for aligning connectors 104 and 106, a design which is possible because of the very effective cooling provided to the rotating element.

Many other ignition sources can be incorporated into the design of the present invention, including any physical ignition source, such as a laser, super hot air, a glow plug or other electric spark source, or by any suitable chemical ignition source. When laser combustion or ignition sources have been adequately developed in the industry, such a laser beam system would be readily adaptable to replace the conventional spark plug in the design of the present invention as desired. For example, the laser can be mounted in the head at about the position of electrode 106 of FIG. 1 to direct a laser beam along the centerline of chamber 98 into the combustion chamber to ignite the fuel air mixture when the element 22 rotates to the ignition point. Alternatively, the laser can simply be directed through a small aperture in the cylinder wall to ignite the mixture. However, the design of the present invention can utilize standard off-the-shelf spark plugs in the meantime.

In addition to the description above, which generally relates to a four cycle combustion engine, the advantages of the present invention can be readily incorporated in a two cycle engine 200, as illustrated in FIG. 9A–G. In the two cycle engine 200, the rotating element 202 rotates about axis 210 within the head 228 of the engine. An air inlet port 226 opens through the head to the rotating element, as does an exhaust port 224. The block 204 mounts a conventional crankshaft 208, connecting rod 222 and piston 206 which reciprocates along the cylinder 230 within the block. The rotating element 202 has a notch which forms a superior port 214 which moves into and out of alignment with the exhaust port 224, combustion chamber 232 and inlet port 226 as the element 202 rotates in the direction of arrow 234 about axis 220. An inferior port 216 is formed in the block 204 which opens through the cylinder wall near the bottom dead center position of the piston 206. In contrast to the four cycle engine, the rotational velocity of the crankshaft 208 about axis 218 is identical to the rotational velocity of the rotating element 202 about axis 220. A fuel injector 220 is mounted in the rotating element 202, as is a spark plug 212.

Figure 9:
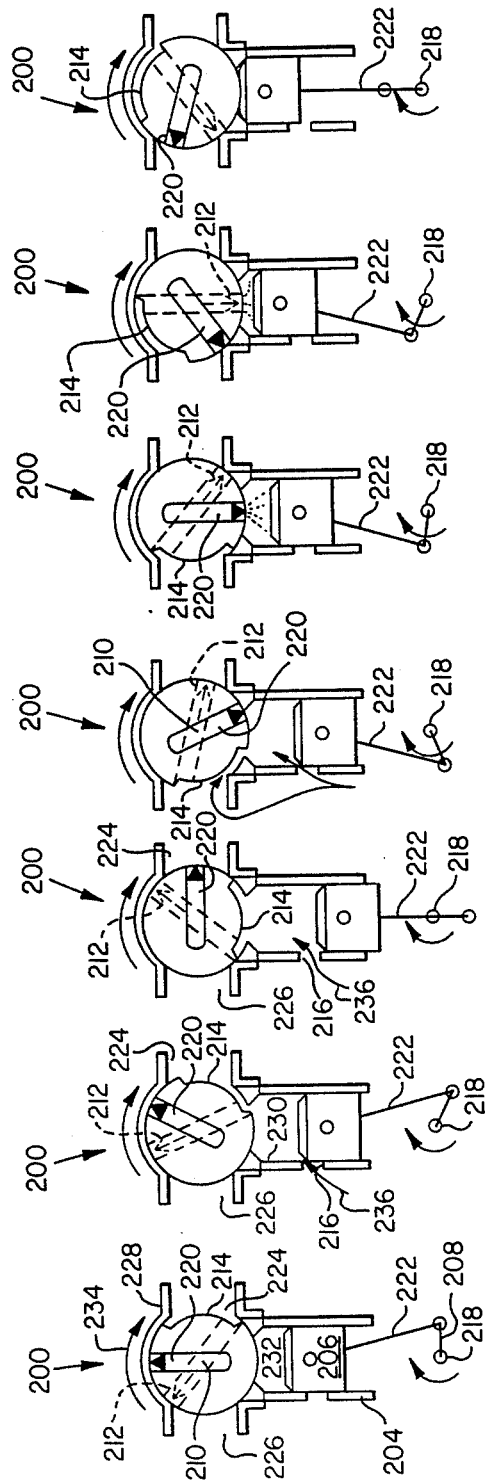
FIGS. 9A-G illustrate the teachings of the present invention applicable to a two cycle internal combustion engine.

With reference to FIGS. 9A–G, the operation of two cycle engine 200 can be described. FIG. 9A illustrates the two cycle engine near the end of the power stroke. As the piston moves downward in the cylinder as shown in FIGS. 9B and C, the inferior port permits fresh air to enter the combustion chamber and the superior port connects the combustion chamber to the exhaust port 224, causing fresh air to flow into the combustion chamber through inferior port 216 in the direction of arrows 236 to purge the combusted air into the exhaust port. Fresh air continues to flow in through both the inferior and superior ports as the engine cycle moves to the position shown in FIG. 9D when the superior port 214 connects the intake port 226 and the combustion chamber 232.

The piston moves upward in the cylinder to compress the air as shown in FIGS. 9E and F. At a desired point in the compression, illustrated in FIG. 9E, fuel is injected by injector 220 into the combustion chamber to mix with the air being compressed. Near the top dead center position of the piston in the cylinder, the spark plug 212, aligned with the center line of the cylinder, is energized to ignite the air and fuel mixture to generate the power stroke illustrated in FIGS. 9G AND 9A.

Among the advantages provided by the present invention applied to a two cycle engine include the reduction of the classic valve overlap of two cycle engines. By incorporating direct injection in the rotating element, scavenging can be done by air alone. This drastically reduces the level of emission contaminants. There is also the opportunity to increase compression, or reduce octane requirements in the fuel. Of course, engine 200 could be operated without a fuel injector in the rotating element if desired, as by conventional carburation or fuel injection.

While several embodiments of the present invention have been illustrated in accompanying drawings, and described in the foregoing Detailed Description, it will be understood that the invention is not limited to the embodiments disclosed, but is capable of numerous arrangements, modifications and substitutions of parts and elements without departing from the scope and spirit of the invention.

We claim:

1. An improved combustion chamber assembly for an internal combustion engine having a block defining a cylinder open at a first end and piston moveable in the cylinder, comprising:
    a head for mounting on the block and defining an inlet passage and an exhaust passage;
    a rotating element having a generally spherical outer surface mounted in said head for rotation about a first axis, a depression formed into the outer surface to define an arcuate notch;
    an annular seal assembly having an annular seal ring forming a circular seal with the outer surface of the rotating element, the annular seal ring lying in a seal plane generally parallel the first axis, the block, seal assembly, rotating element and piston defining a combustion chamber;
    rotation of the rotating element about the first axis in a first rotational direction sequentially connecting the inlet passage and combustion chamber through the notch to charge the combustion chamber with a combustible mixture, sealing the combustion chamber for compression of the combustible mixture and combustion of the mixture, and connecting the exhaust passage to the combustion chamber to exhaust the combusted gases, the annular seal ring rotating about a second axis perpendicular the seal plane as the rotating element rotates to equalize wear between the seal and rotating element.

2. The combustion chamber assembly of claim 1 wherein said rotating element has a passage formed through the interior thereof for coolant flow.

3. The combustion chamber assembly of claim 1 wherein said rotating element includes means for igniting the combustible mixture in the combustion chamber.

4. The combustion chamber assembly of claim 3 wherein the ignition means is a spark plug mounted within the rotating element.

5. The combustion chamber assembly of claim 4 wherein the spark plug is mounted with the spark gap traversing the combustion chamber along an arc centered on the first axis, the electrode end of the spark plug so positioned as to never cross the combustion chamber.

6. The combustion chamber assembly of claim 4 wherein an ignition coil is mounted in the rotating element.

7. The combustion chamber assembly of claim 4 further having means in the rotating element for mounting a second spark plug, or more.

8. The combustion chamber assembly of claim 4 further having means for generating multiple sparks at the spark gap as the spark plug spark gap traverses the combustion chamber.

9. The combustion chamber assembly of claim 3 wherein said ignition means is a laser beam.

10. The combustion chamber assembly of claim 1 wherein the internal combustion engine is a diesel engine.

11. The combustion chamber assembly of claim 1 further having a fuel injector in the inlet passage to charge the combustion chamber when the inlet passage is connected to the combustion chamber through the notch.

12. The combustion chamber assembly of claim 1 further having a fuel injector mounted within the rotating element to inject a fuel into the combustion chamber.

13. The combustion chamber assembly of claim 1 wherein the seal assembly further includes a first noncontinuous annular seal retainer having first and second abutting ends, the first annular seal retainer having an annular notch receiving a portion of the annular seal ring, said first annular seal retainer mounted in the internal combustion engine to urge the seal ring into sealing engagement with the rotating element, the first and second abutting ends lying in parallel planes extending obliquely to the seal plane and in sliding engagement to each other so that said first and second ends slide relative to each other as the first annular seal retainer expands or contracts with temperature variations.

14. The combustion chamber assembly of claim 13 wherein the first annular seal retainer has a generally V-shaped cross section with a plurality of holes formed through the wall facing the combustion chamber to form a gas cushion between the seal ring and the first annular seal retainer in the notch.

15. The combustion chamber assembly of claim 13 further having a second noncontinuous annular seal retainer having first and second ends abutting each other, the second annular seal retainer have an annular notch receiving a portion of the first annular seal retainer, said second annular seal retainer mounted in the internal combustion engine to urge the seal ring into sealing engagement with the rotating element, the first and second ends of the second annular seal retainer lying in parallel planes extending obliquely to the seal plane and in sliding engagement to each other so that first and second ends slide relative to each other as the second annular seal retainer expands or contracts with temperature variation.

16. The combustion chamber assembly of claim 1 wherein the seal plane defines a slight angle with the first axis to induce rotation in the seal ring about the second axis.

* * * * *